(12) United States Patent
Berges et al.

(10) Patent No.: US 6,533,225 B1
(45) Date of Patent: Mar. 18, 2003

(54) WALL-MOUNTED AUDIO CONTROL HOUSING AND RECEPTACLE THEREFOR

(75) Inventors: Jon Berges, San Clemente, CA (US); Ray Call, Mission Viejo, CA (US)

(73) Assignee: Dana Innovations, San Clemente, CA (US)

( * ) Notice: Subject to any disclaimer, the term of this patent is extended or adjusted under 35 U.S.C. 154(b) by 0 days.

(21) Appl. No.: 10/005,809

(22) Filed: Dec. 3, 2001

(51) Int. Cl.[7] ................................................. G12B 9/00
(52) U.S. Cl. ..................................... 248/27.1; 220/241
(58) Field of Search ............................... 248/27.1, 27.3, 248/906, 231.9; 220/241, 242, 50, 53, 66, 67

(56) References Cited

U.S. PATENT DOCUMENTS

| | | | | |
|---|---|---|---|---|
| 1,999,194 A | * | 4/1935 | Hubbell ........................ | 174/58 |
| 2,297,862 A | * | 10/1942 | Bachmann .................. | 220/3.6 |
| 4,098,423 A | * | 7/1978 | Marrero ....................... | 220/3.6 |
| 4,295,018 A | * | 10/1981 | Borrelli ..................... | 200/51.09 |
| 4,485,282 A | * | 11/1984 | Lee ........................... | 200/51 R |
| 5,223,673 A | * | 6/1993 | Mason ........................ | 174/53 |
| 5,895,888 A | * | 4/1999 | Arenas et al. ................ | 174/66 |
| 6,158,802 A | * | 12/2000 | Akagi et al. ................. | 296/214 |

* cited by examiner

Primary Examiner—Ramon O. Ramirez
Assistant Examiner—Kofi Schulterbrandt
(74) Attorney, Agent, or Firm—Stetina Brunda Garred & Brucker

(57) ABSTRACT

An apparatus for mounting an audio control in a wall is disclosed. The apparatus includes a wall-mountable housing having cleats on the front inner rim thereof and a first set of horizontal ribs spaced equally along the interior walls thereof. An audio control housing is provided for supporting the audio control and engagement of the audio control to the wall-mounted housing. The audio control housing includes flex fingers with ridges formed thereon. The flex finger ridges are operative to retractably engage the cleats to secure the audio control housing within the wall-mounted housing. The ridges are set at different spacings apart so that the audio control housing may be engagably received within the wall-mounted housing set at different depths.

18 Claims, 6 Drawing Sheets

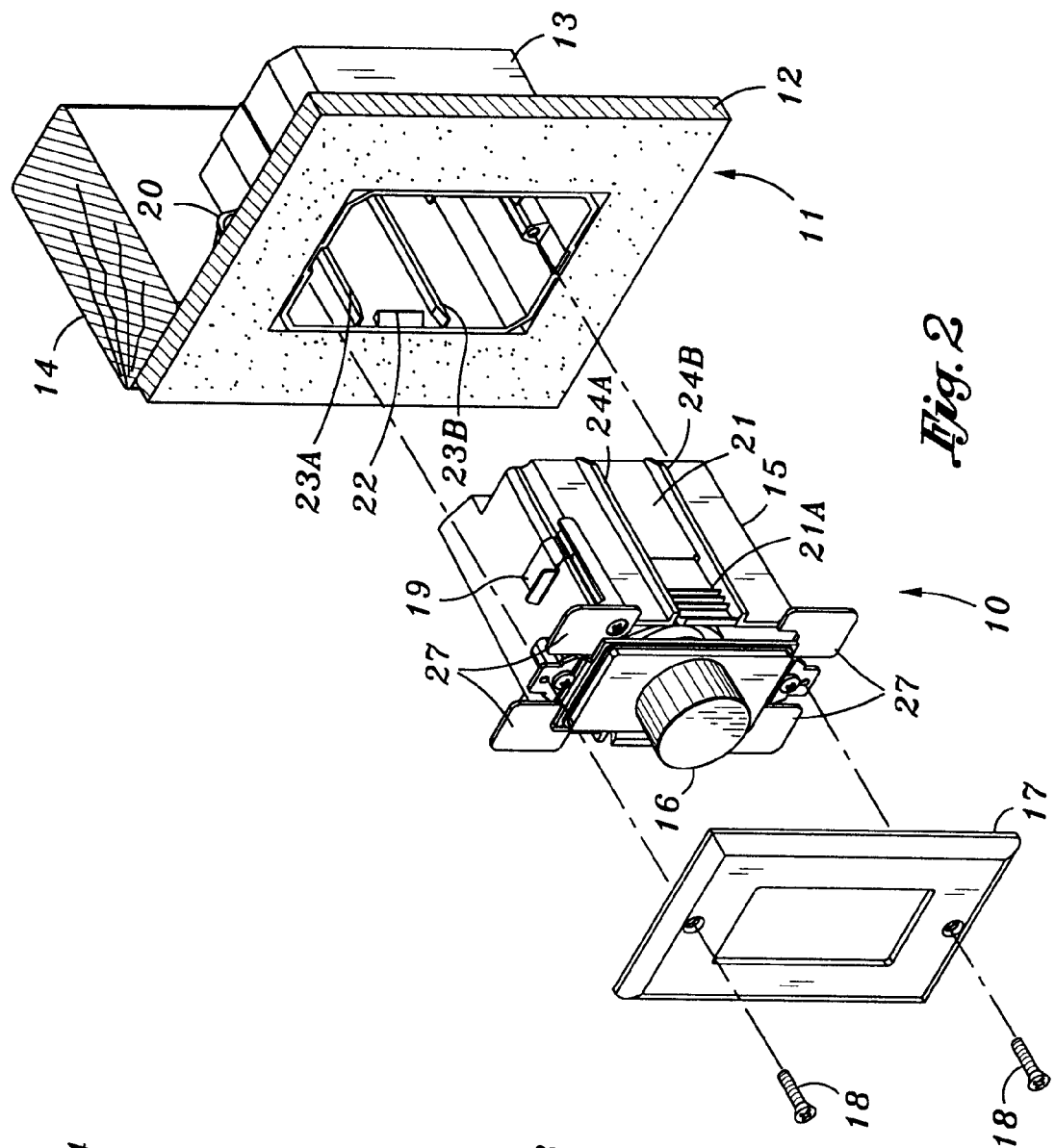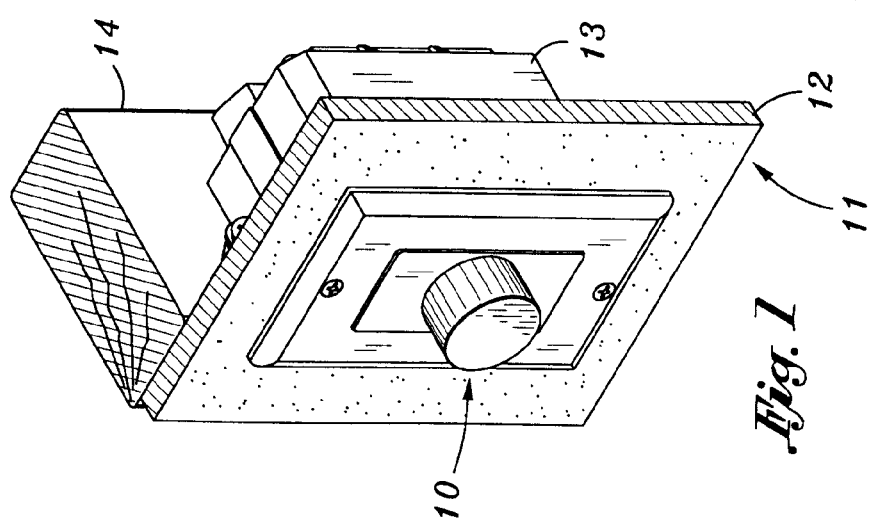

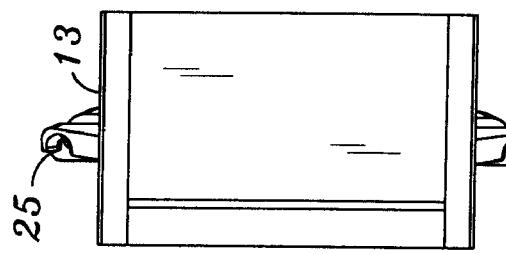
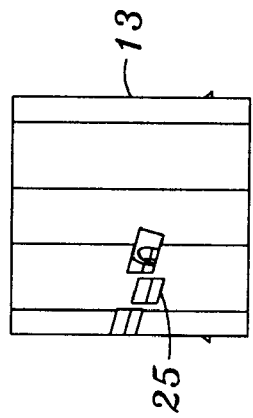
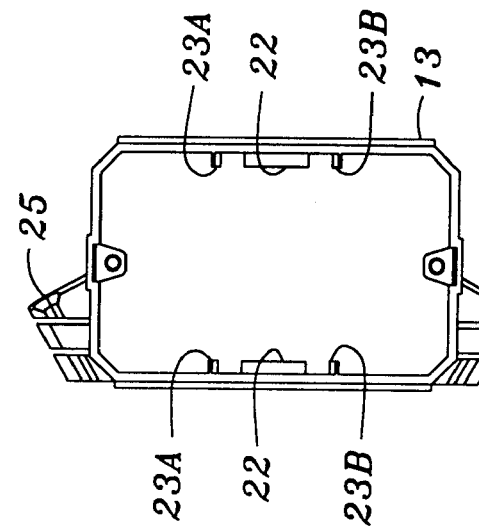
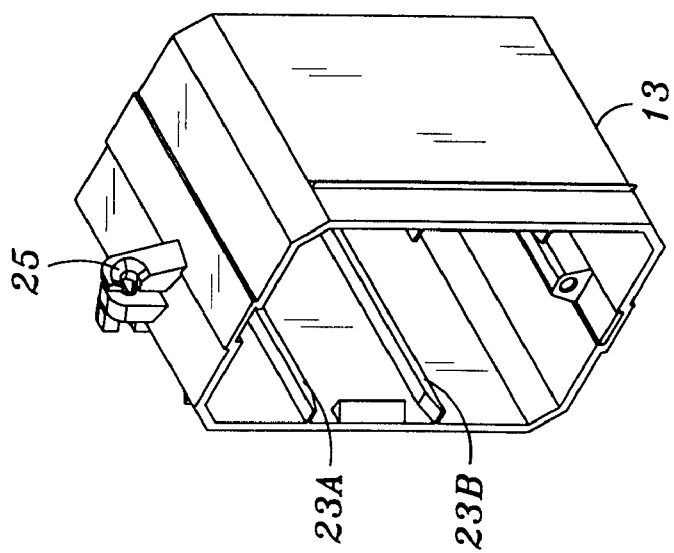

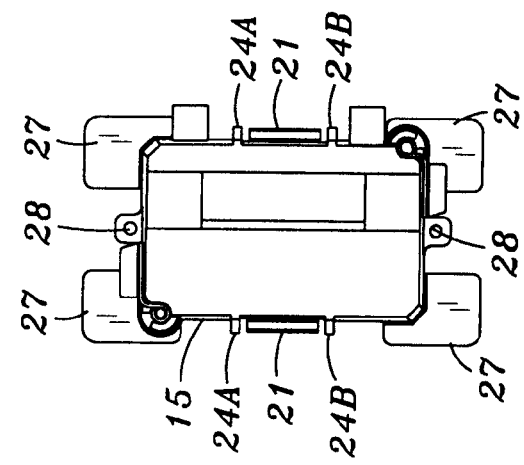
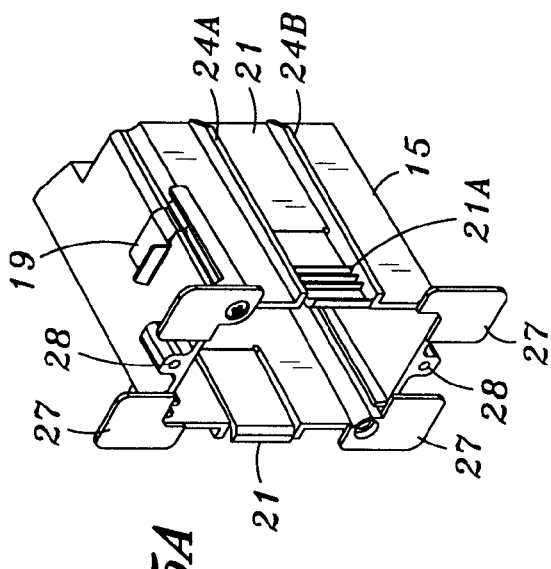
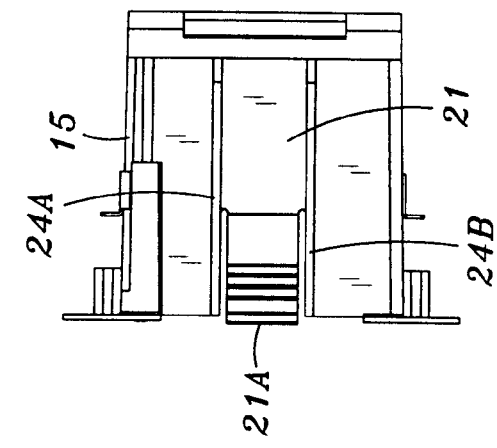
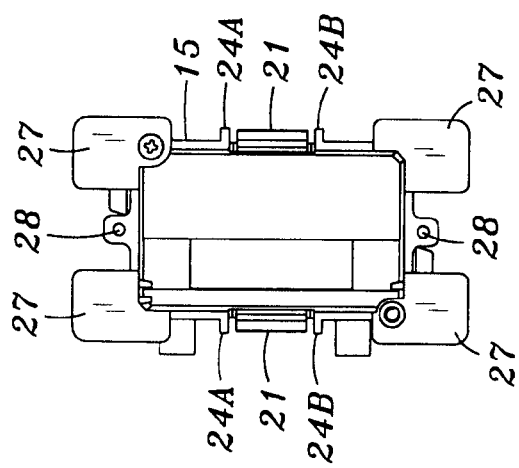

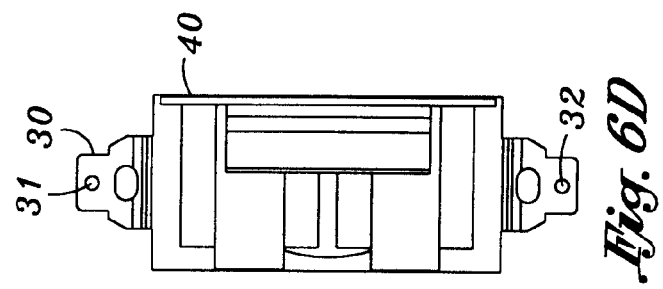
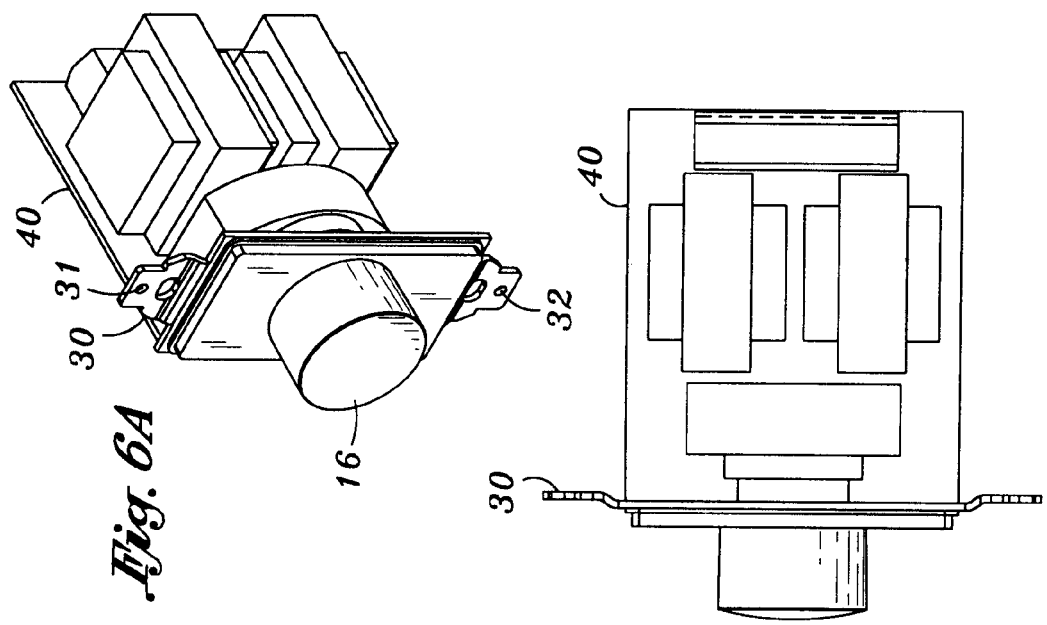
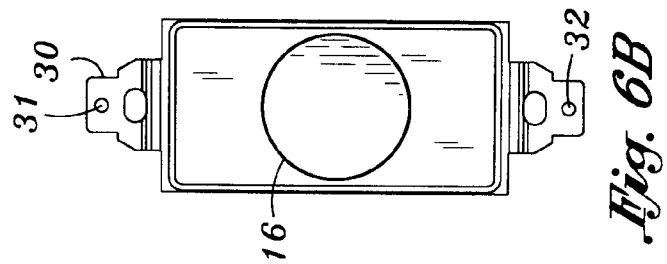

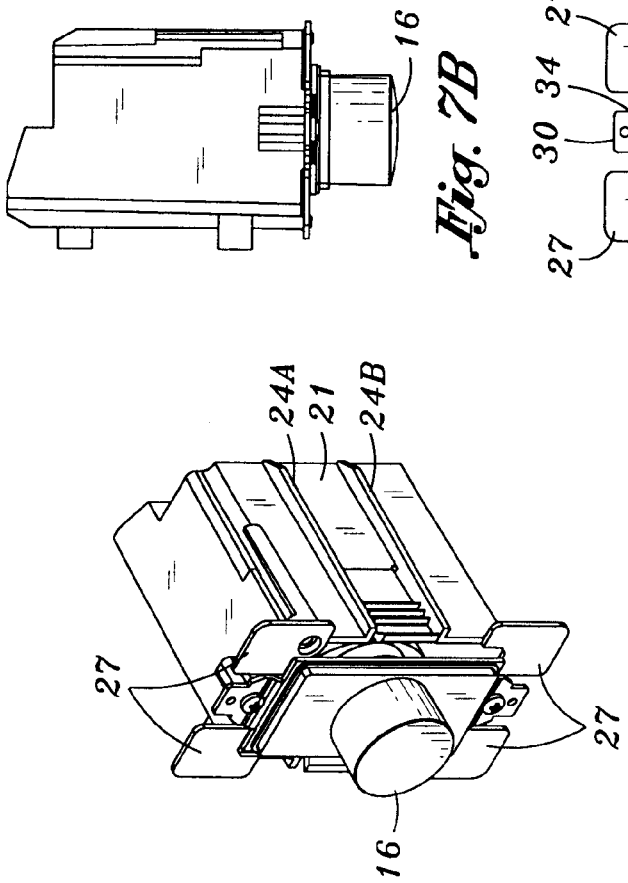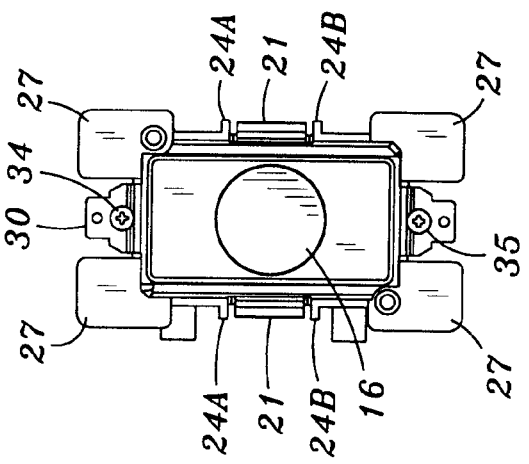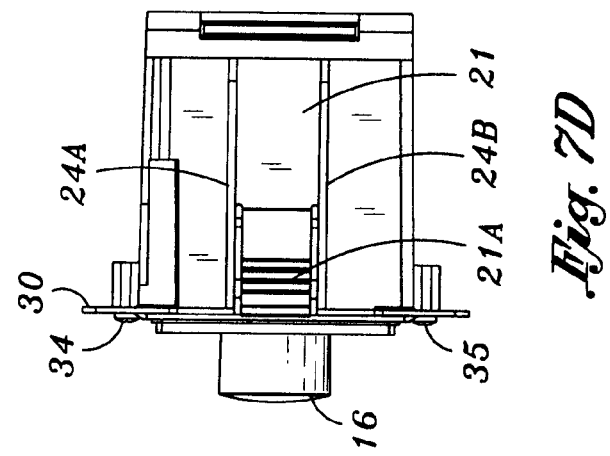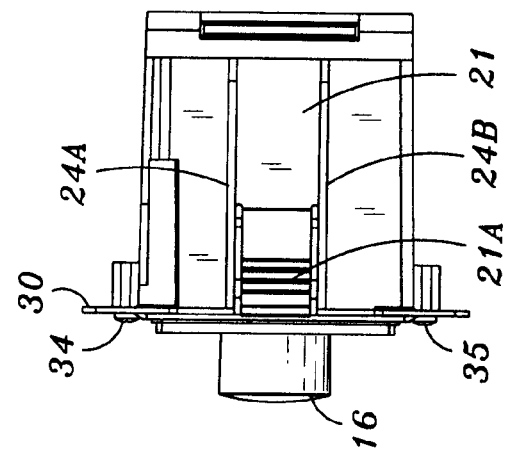

WALL-MOUNTED AUDIO CONTROL HOUSING AND RECEPTACLE THEREFOR

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to wall-mounted audio controls and in particular to an audio control housing and a wall mountable receptacle for receiving the audio control and its housing.

Typically, in the past when installing home entertainment systems having audio controls mounted in the wall, a technician would turn an electrical box around and trace a cut-out on the wall. A plug would be removed from the sheetrock wall covering where marked, and the audio control would be installed in the opening. The audio control would then be cleated or otherwise screwed into the sheetrock wall covering. Over time, and due to frequent use of the audio control, the sheetrock would flake away and the audio control would become loose in the wall.

Since it is desirable to mount an audio control, near the speakers or equipment that are controlled thereby, the location of the wall mount may not always be the easiest for installation. When installing an audio control easiest for installation. When installing an audio control in an existing structure, versus new construction, extra care must be taken not to damage the wall; while at the same time mounting the control securely to the wall. The problem arises when trying to anchor a receptacle to a wall stud when the only access is an opening in the wall covering just large enough to receive the receptacle. Once installed, the audio control would be held in place merely by attachment to the wall covering, such as sheetrock. Over time and from frequent use, this too would cause the sheetrock to flake away and loosen.

Another problem with the prior art audio controls built for a wall mount is that there is potential damage from dust (e.g., sheetrock dust), fibers from wall insulation and dirt in general at a construction site.

Another prior art installation technique is to employ electrical junction boxes for housing the audio control. This normally works satisfactorily. However, it becomes more difficult when repairing or replacing the audio control. Moreover, it may be necessary to cut off the back of such junction boxes to fit certain audio control devices.

Accordingly, there is a need for an audio control and wall mount built expressly for supporting and housing an audio control. Moreover, there is a need for an audio control mount that allows easy removal and reinstallation for servicing or de-bugging a recently installed system.

BRIEF SUMMARY OF THE INVENTION

It is an object of the present invention to provide an improved audio control mounting for a wall, which audio control includes a modular receptacle therefor.

Another object of the present invention is to provide a wall-mount receptacle that allows for a quick and easy installation and screwless removal of an audio control.

Still another object of the present invention is to provide an improved housing for use in mounting an audio control module into walls of various thicknesses.

These and other objects, which will become apparent as the invention is described in detail below, are provided by an apparatus for housing an audio control and for securing the audio control to a wall. The apparatus includes a wall-mounted housing securable to a wall stud. The wall-mounted housing also includes a pair of cleats on an inner surface thereof. An audio control housing is provided for supporting the audio control and for engagement of the audio control to the wall-mounted housing. The audio control housing includes flex fingers with ridges formed thereon, wherein the ridges are operative to retractably engage the cleats to secure the audio control housing within the wall-mounted housing.

Another feature of the apparatus is that the ridges may be formed on the flex fingers and set at different spacing apart so that the audio control housing may be engagably received within the wall-mounted housing set at different depths.

Still another feature of the apparatus is that the wall-mounted housing may include a first set of horizontal ribs spaced equally along the inside walls thereof and the audio control housing may include a second set of horizontal ribs spaced to receive the first ribs so as to guide the audio control housing during insertion thereof into the wall-mounted housing.

Yet another feature of the apparatus is that the audio control housing may include a pair of grooves on the inside top and bottom thereof for receiving edges of a PC board component of the audio control module. Thus, the audio control module is securely held inside of the audio control housing.

Still other objects and features of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, wherein:

FIG. 1 is a perspective view of the audio control module mounted flush into a wall in accordance with the present invention.

FIG. 2 is a exploded view of the audio control module and receptacle therefor for mounting into a wall in accordance with the present invention.

FIGS. 4A, 4B, 4C and 4D are perspective, top, front and side views, respectively, of the wall-mounted housing for receiving the audio control housing.

FIGS. 5A, 5B, 5C and 5D are perspective, front, side and rear views, respectively, of the audio control housing.

FIGS. 6A, 6B, 6C and 6D are perspective, front, side and rear views, respectively, of the audio control module.

FIGS. 7A, 7B, 7C and 7D are perspective, top, front, and side views, respectively, of the audio control module mounted into the audio control housing.

DETAILED DESCRIPTION OF THE INVENTION

Figure 3:
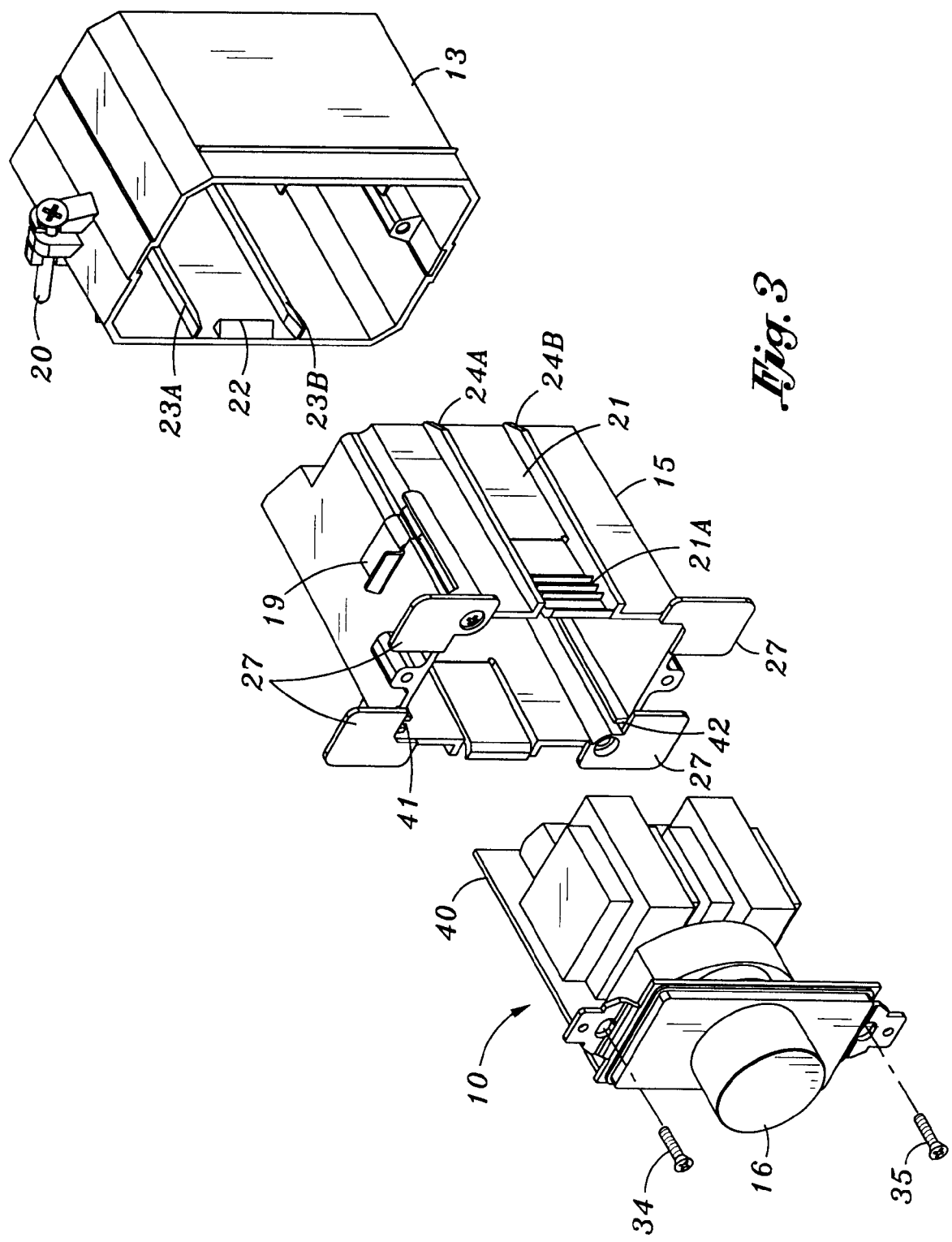
FIG. 3 is an exploded view of the audio control module and receptacle therefor in accordance with the present invention.

Referring now to the drawings and to FIG. 1 in particular, an audio control module 10 according to the present invention is shown in a perspective view mounted into a wall 11 having a sheetrock covering 12. However, it is pointed out that the present invention is also adaptable to other types of wall covering. In a new construction installation the module 10 is mounted into a housing 13, which is affixed to a stud 14. Details of the module 10 are shown in the exploded view of FIG. 2, wherein like reference numerals identify like parts. The audio control module 10 includes an audio control housing 15 that supports and protects the audio control 10. The audio control 10 is further provided with a control knob 16 and a trace plate 17 to cover the module once mounted into the wall 12 by means of screws 18.

The housing 13 (new construction housing) may be rigidly affixed to the stud 14 by means of a screw or nail 20 or the like in the manner usually employed in the construction industry for mounting electrical boxes in walls. The audio control housing 15 (retrofit housing) may include a pair of flex fingers 21 having ridges 21A for securing it to the housing 13 by engagement of the ridges with cleats 22. The housing 13 may include a pair of horizontal ribs 23A and 23B formed on each of the inside walls thereof. The audio control housing 15 includes a matching set of horizontal ribs 24A and 24B formed on each of the outer walls thereof such that the ribs 23A and 23B receive and engage the ribs 24A and 24B as the audio control housing is being inserted into the wall mounted housing 13.

Referring now to FIG. 3, another exploded view of the audio control module 10 is shown in greater detail. Again like reference numerals identify like parts. In one embodiment the audio control 10 includes a PC board 40, which is formed to slidably engage slots 41 and 42 of the audio control housing 15. The flex fingers 21 (one on each side and only one is shown in the figure) are capable of bending inward of the housing 15 in order to clear the cleats 22 while inserting the module 15. Once inserted, the installer releases the flex fingers 21 so that they may engage the cleats 22. This secures the audio control housing 15, and thus the audio control module 10 in the housing 13. The ridges 21A on the flex fingers 21 are spaced to match the thickness of the wall sheetrock covering. For example, ½" is a standard thickness for most houses and ⅝" is usually used for commercial buildings. The ridges on the flex fingers enable installation of the audio control 10 in these or other sheetrock thicknesses.

When installing the audio control 10 and housing into an existing wall (i.e., a retrofit installation), an opening may be formed in the wall covering 12 for receiving the outer rim of the housing 15. The housing 15 is secured to the wall covering 12 by means of at least one translatable clamp 19 that is translatable after installation into a wall to engage the back (interior) side of the wall covering. The housing also includes four stop flanges 27 that engage the front (outer) side of the wall covering. Retrofit installations do not normally use the housing 13 because it is not feasible to attach it to the stud from the same small opening made in the wall covering.

Consequently, the present invention may be viewed as a combination of mateable housings; one suitable for new construction installations, and the other independently suitable for retrofit installations. Where a new construction installation is to take place, both housing are used. Where a retrofit installation is to take place, only the inner housing is used. A number of screws to be set in place is minimized and variations in wall thicknesses are easily accommodated by simply pushing the inner housing in place until the stop flanges 27 rest against the wall. This greatly simplifies the installation procedure, reduces installation time, and therefore allows an custom installer to reliably install multiple audio controllers throughout a house in a minimal period of time. The use of quick connect connecting blocks on the rear side of the inner module further simplifies the installation process.

Referring now to FIGS. 4A through 4D, perspective, top, front and side views, respectively, of the housing 13 are shown. The housing 13 is open in the back as distinguished from an electrical wiring box, which is closed. This enables distinction of the housing 13 from electrical boxes on a job site and aids in wiring of the module 10. Brackets 25 and 26 are formed on the top and bottom of the housing 13 for receiving screws or nails to secure the housing to a wall stud. Also, in FIG. 4C both of the cleats 22 are clearly shown on the inner, front rim of the housing 13.

Referring now to FIGS. 5A through 5D, perspective, front, side and rear views, respectively, of the inner housing 15 are shown. The flex fingers 21 and ridges 21A are clearly shown in these figures. Stop flanges 27 may be placed at the four corners of the audio control housing 15 to prevent the housing from receding into the wall. That is, when the audio housing is inserted into the wall-mounted housing 13, the stop flanges 27 abut against the wall surface and stop the inner housing from receding beyond a desired depth. When the audio control housing 15 is inserted at the desired depth, as determined by the stop flanges 27, the flex fingers engage the cleats 22. This holds the audio control housing 15, with the module 10 secured therein, tautly in the wall-mounted housing 13. Threaded screw holes 28 are formed in the top and bottom of the audio control housing 15 for securing the audio control module thereto. Moreover, with reference to FIG. 5D, the rear of the housing 15 maybe closed except for an opening 29 for the passing of low voltage wires (e.g., audio signal, power supply, control signals) to enter the audio control module 10.

Referring now to FIGS. 6A through 6D, perspective, front, side and rear views, respectively, of the audio control module 10 are shown. A bracket 30 is attached to the front of the module 10 for use in securing the module to the audio control housing 15. The bracket 30 extends beyond the top and bottom of the module and includes openings 31 and 32 for receiving screws that secure the module to the housing 15. Electrical connections and other components (not shown) of the audio control are assembled onto the PC board 40.

Referring now to FIGS. 7A through 7D, perspective, top, front and side views, respectively, of the module 10 inside the audio control housing 15 are shown. In FIGS. 7C and 7D: screws 34 and 35 may be seen, which screws secure the module 10 within the housing 15.

Although the invention has been described with reference to a specific embodiment, this description is not meant to be construed in a limiting sense. Various modifications of the disclosed embodiment as well as alternative embodiments of the invention will become apparent to one skilled in the art upon reference to the description to the invention. It is therefore contemplated that the appended claims will cover any modifications of the embodiments that fall within the true scope of the invention.

We claim:

1. An apparatus for housing an audio control and for securing said audio control to a wall, said apparatus
   a. a first housing securable to a wall stud, said first housing including cleats on the front inner rim thereof;
   b. a second inner housing for enclosing said audio control, said second inner housing including flex fingers with ridges formed thereon and being disposed for engaging said cleats in order to secure said second inner housing inside of said first housing;
   c. said second inner housing including a member for securing said audio control inside of said second inner housing;
   d. flanges on the front rim of said second inner housing for setting the depth at which said second inner housing may be inserted into said first housing; and
   e. at least one clamp mounted onto a side of said second inner housing for engaging the interior side of said wall.

2. The apparatus as in claim 1 wherein the back of said first housing is open for receiving low voltage wires.

3. The apparatus as in claim 1 wherein the back of said second inner housing is closed except for a small opening for receiving low voltage wires.

4. The apparatus as in claim 1 wherein said ridges formed on said flex fingers are set at different spacings apart so as to accommodate multiple wall covering thicknesses.

5. An apparatus for housing an audio control and for securing said audio control to a wall, said apparatus comprising:
   a. a first housing securable to a wall stud, said first housing including cleats on the front inner rim thereof;
   b. a second inner housing for enclosing said audio control, said second inner housing including flex fingers with ridges formed thereon and being disposed for engaging said clears in order to secure said second inner housing inside of said first housing;
   c. said second inner housing including a member for securing said audio control inside of said second inner housing; and
   d. said first housing including a first set of horizontal ribs spaced equally along the interior walls thereof and said second inner housing including a second set of horizontal ribs spaced to match said first ribs and being formed on the outside of said second inner housing, whereby said first set of ribs engage said second set of ribs so as to guide said second inner housing, including said audio control module secured therein, during insertion thereof into said first housing.

6. An apparatus for housing an audio control and for securing said audio control to a wall, said apparatus comprising:
   a. a first housing securable to a wall stud, said first housing including cleats on the front inner rim thereof;
   b. a second inner housing for enclosing said audio control, said second inner housing including flex fingers with ridges formed thereon and being disposed for engaging said cleats in order to secure said second inner housing inside of said first housing;
   c. said second inner housing including a member for securing said audio control inside of said second inner housing; and
   d. said second inner housing including a pair of grooves running front to back for receiving edges of a PC board of said audio control module, thereby adding rigidity to said module when mounted in said second inner housing.

7. An apparatus for mounting an audio control in a wall, said apparatus comprising:
   a. a wall-mountable housing including cleats on the front inner rim thereof and a first set of horizontal ribs spaced equally along the interior walls thereof;
   b. an audio control housing for enclosing said audio control including flex fingers with ridges formed thereon and being disposed for engaging said cleats in order to secure said audio control housing inside of said wall-mountable housing; and,
   c. said audio control housing including a second set of horizontal ribs spaced to match said first ribs and being formed on the outside of said audio control housing, whereby said first set of ribs engage said second set of ribs so as to guide said audio control housing, including said audio control module secured therein, during insertion thereof into said wall-mountable housing.

8. The apparatus as in claim 7 wherein the back of said wall-mountable housing is open for receiving low voltage wires.

9. The apparatus as in claim 7 wherein the back of said audio control housing is closed except for a small opening for receiving low voltage wires.

10. The apparatus as in claim 7 further including at least one flange on the front rim of said audio control housing for setting the depth at which said audio control housing may be inserted into said wall mountable housing.

11. The apparatus as in claim 10 further including at least one clamp mounted onto a side of said audio control housing for engaging the interior side of said wall.

12. The apparatus as in claim 7 wherein said ridges formed on said flex fingers are set at different spacings apart so as to accommodate multiple wall covering thicknesses.

13. The apparatus as in claim 7 wherein said wall-mountable housing includes a first set of horizontal ribs spaced equally along the interior walls thereof and said audio control housing includes a second set of horizontal ribs spaced to match said first set of horizontal ribs and being formed on the outside of said audio control housing, whereby said first set of horizontal ribs engage said second set of horizontal ribs so as to guide said audio control housing, including said audio control module secured therein, during insertion thereof into said wall mountable housing.

14. The apparatus as in claim 7 wherein said second audio control housing includes a pair of grooves running front to back for receiving edges of a PC board of said audio control module, thereby adding rigidity to said module when mounted in said housing.

15. An apparatus for mounting an audio control in an existing wall, said apparatus comprising:
   a. an audio control housing for enclosing said audio control including flanges on the front rim thereof for setting the depth at which said housing may be inserted into the wall; and,
   b. said audio control housing including a clamp mounted onto a side thereof for clamping the inside of the wall in opposition to said flanges, thereby securing said audio control module to said wall.

16. The apparatus as in claim 15 wherein said audio control housing includes a pair of grooves running front to back for receiving edges of a PC board of said audio control module, thereby adding rigidity to said module when mounted to the wall.

17. An audio control mounting system having components for installing audio controls into a wall in either a new construction or retrofit installation, the system comprising:

a first housing mountable within a wall to support a new construction installation;

a second housing slideably engageable within the first housing through the wall, the second housing including at least one translatable clamp mounted on the second housing for engaging the interior side of the wall when a retrofit installation occurs; and an audio control mountable within the second housing;

wherein the second housing may be combined with the first housing to support new construction installations, and used independent of the first housing in support of retrofit installations.

18. The system as recited in claim 17 wherein the second housing is engageable to the first housing at a plurality of depths therein.

* * * * *